United States Patent
Gya et al.

(10) Patent No.: US 9,856,646 B2
(45) Date of Patent: Jan. 2, 2018

(54) LENGTH PROFILE DEVICE

(75) Inventors: Arne Gya, Bryne (NO); Tor William Hoyvik, Sandnes (NO)

(73) Assignee: Øglaend System AS, Kleppe (NO)

(*) Notice: Subject to any disclaimer, the term of this patent is extended or adjusted under 35 U.S.C. 154(b) by 705 days.

(21) Appl. No.: 13/393,292

(22) PCT Filed: Aug. 30, 2010

(86) PCT No.: PCT/NO2010/000319
§ 371 (c)(1),
(2), (4) Date: May 14, 2012

(87) PCT Pub. No.: WO2011/028126
PCT Pub. Date: Mar. 10, 2011

(65) Prior Publication Data
US 2012/0217352 A1 Aug. 30, 2012

(30) Foreign Application Priority Data
Sep. 2, 2009 (NO) .................................. 20092932

(51) Int. Cl.
*F16L 3/00* (2006.01)
*E04C 3/09* (2006.01)
*H02G 3/04* (2006.01)
*E04C 3/04* (2006.01)

(52) U.S. Cl.
CPC .............. *E04C 3/09* (2013.01); *H02G 3/0487* (2013.01); *E04C 2003/043* (2013.01); *E04C 2003/0421* (2013.01); *E04C 2003/0469* (2013.01)

(58) Field of Classification Search
USPC ........... 52/364, 474, 632, 720, 730.4, 732.1, 52/650.1, 737.6, 731.7; 248/49, 56–58, 248/65, 68.1, 72, 74.4
See application file for complete search history.

(56) References Cited

U.S. PATENT DOCUMENTS

| | | | |
|---|---|---|---|
| 854,397 A * | 5/1907 | Beach | 138/157 |
| 1,179,820 A * | 4/1916 | Gilliland | 238/54 |
| 1,242,892 A * | 10/1917 | Wagner | 52/844 |
| 1,365,411 A * | 1/1921 | Kearney | 24/136 R |
| 1,645,060 A * | 10/1927 | Kraft | 52/634 |
| 1,656,810 A * | 1/1928 | Arnstein | 52/634 |
| 1,656,871 A * | 1/1928 | Schnitzer | 52/634 |
| 1,750,833 A * | 3/1930 | Carns | 52/831 |
| 1,994,716 A * | 3/1935 | Klemperer | 52/634 |

(Continued)

FOREIGN PATENT DOCUMENTS

| EP | 0 554 606 A1 | 8/1993 |
|---|---|---|
| EP | 0 554 606 B1 | 10/1997 |

(Continued)

OTHER PUBLICATIONS

International Search Report for parent application PCT/NO2010/000319, dated Nov. 26, 2010.

(Continued)

*Primary Examiner* — Monica Millner
(74) *Attorney, Agent, or Firm* — Andrus Intellectual Property Law, LLP

(57) ABSTRACT

A long, hollow, multiple sided profile device where at least one of the sides is provided with a bolthole, and where at least one of the sides of the profile is provided with a bolt opening.

9 Claims, 4 Drawing Sheets

(56) References Cited

U.S. PATENT DOCUMENTS

| | | | | |
|---|---|---|---|---|
| 2,067,403 A * | 1/1937 | Lea | ............... | 52/481.1 |
| 3,094,197 A * | 6/1963 | Attwood | ............... | 52/100 |
| 3,098,266 A * | 7/1963 | Oehmig | ............... | 52/213 |
| 4,003,168 A * | 1/1977 | Brady | ............... | 52/118 |
| 5,039,256 A * | 8/1991 | Gagliano | ............... | 405/244 |
| 5,050,273 A * | 9/1991 | Okura | ............... | 24/136 R |
| 5,142,745 A * | 9/1992 | Setty et al. | ............... | 24/136 R |
| 5,307,601 A * | 5/1994 | McCracken | ............... | 52/364 |
| 5,379,567 A * | 1/1995 | Vahey | ............... | 52/850 |
| 5,426,906 A * | 6/1995 | McCracken | ............... | 52/650.1 |
| 5,660,008 A * | 8/1997 | Bevilacqua | ............... | 52/169.5 |
| 5,809,734 A * | 9/1998 | Turner | ............... | 52/843 |
| 5,971,295 A * | 10/1999 | Jensen et al. | ............... | 239/77 |
| 6,012,256 A * | 1/2000 | Aschheim | ............... | 52/167.1 |
| 6,053,283 A * | 4/2000 | Lingen | ............... | 182/146 |
| 6,688,070 B2 * | 2/2004 | Vahey | ............... | 52/843 |
| 6,837,446 B1 * | 1/2005 | Jesse | ............... | 239/161 |
| 8,458,988 B2 * | 6/2013 | Kamenomostskiy | ............... | 52/801.11 |
| 2001/0042352 A1 * | 11/2001 | Pudney | ............... | 52/726.2 |
| 2004/0237280 A1 * | 12/2004 | Birnbaum et al. | ............... | 29/509 |
| 2010/0037551 A1 * | 2/2010 | Bodnar | ............... | 52/634 |
| 2012/0210762 A1 * | 8/2012 | Hermann et al. | ............... | 72/199 |
| 2012/0279162 A1 * | 11/2012 | Strickland et al. | ............... | 52/588.1 |

FOREIGN PATENT DOCUMENTS

| | | |
|---|---|---|
| EP | 1 446 586 A1 | 8/2004 |
| EP | 1 446 586 B1 | 6/2006 |
| EP | 1 712 697 A2 | 10/2006 |
| GB | 2 358 007 B | 6/2003 |

OTHER PUBLICATIONS

Written Opinion for parent application PCT/NO2010/000319, dated Nov. 26, 2010.

Applicant's Response dated Jun. 30, 2011 to Written Opinion dated Nov. 26, 2010 for parent application PCT/NO2010/000319.

Written Opinion for parent application PCT/NO2010/000319, dated Aug. 25, 2011.

International Preliminary Report for parent application PCT/NO2010/000319, having a completion date of Nov. 23, 2011.

* cited by examiner

LENGTH PROFILE DEVICE

CROSS-REFERENCE TO RELATED APPLICATIONS

This application is the U.S. national stage application of International Application No. PCT/NO2010/000319, filed Aug. 30, 2010, which International application was published on Mar. 10, 2011 as International Publication No. WO 2011/028126 A1in the English language and which application is incorporated herein by reference. The International application claims priority of Norwegian Patent Application No. 20092932, filed Sep. 2, 2009, which application is incorporated herein by reference.

BACKGROUND

This invention relates to a long, hollow, multiple-sided profile device. More particularly it concerns a long, hollow, multiple-sided profile device where at least one of the sides of the profile is provided with boltholes.

In the following the term bolthole is used for a through opening where a bolt is positioned in its position of use. The bolthole may for example have a circular, square or rectangular cross-section. The term bolt opening is used for a through opening used for introducing a bolt into its position of use.

During building of support structures, for such as tubing and cableways, plate profiles in the form of open, angular profiles or U-shaped profiles are often used. The sides of the profiles are provided with boltholes for making it easy to connect the profiles by means of bolts.

It is well known that open profiles, typically angular profiles have relatively low flexural rigidity, while closed profiles such as triangular profiles are appreciably better suited as slender columns. Closed profiles also have greater torsion stiffness.

Closed profiles have however the drawback that the introduction of bolts for the boltholes may be difficult.

SUMMARY

The object of the invention is to remedy or reduce at least one of the disadvantages of the prior art.

The object is achieved in accordance with the invention by the features disclosed in the below description and in the subsequent claims.

There is provided a long, hollow, multiple sided profile where at least one of the sides is provided with a bolthole, and where the profile is characterised in that the at least one of the sides of the profile is provided with a bolt opening.

A bolt may thus relatively easily be displaced in through the bolt opening whereafter the bolt body is displaced through the bolthole and further into another component, which is to be attached to the profile.

Advantageously the bolt opening may correspond with the bolthole, i.e. the bolt opening and the bolthole are close to each other along the profile.

It may be appropriate that the bolt opening corresponds with boltholes in more than one of the profile sides.

The bolt opening may be oval and have its largest length in the longitudinal direction of the profile. The bolt opening may thus fit rectangular boltholes where the position of use of the bolt in the longitudinal direction of the profile may be different, or multiple boltholes in an opposing profile side.

The profile may be constituted by a plate profile where a longitudinal joint is cut by the bolt opening. The bolt opening is thus on both sides of the plate joint.

In a profile of this type boltholes and bolt openings may be punched out first, whereafter the profile by means of such as bending or rolling is given its shape.

Alternative production methods may be extrusion or pipe expanding with following form rolling.

The plate joint may be made by such as welding or folding.

A profile according to the invention prepares for profiles having relatively high buckling stiffness and may be connected to other components in a simple and work efficient manner. The invention renders the use of bolts running right through the hollow profile superfluous. This saves both work and cost.

BRIEF DESCRIPTION OF THE DRAWINGS

In the following is described an example of a preferred embodiment illustrated in the accompanying drawings, wherein.

DETAILED DESCRIPTION OF THE DRAWINGS

Figure 1:
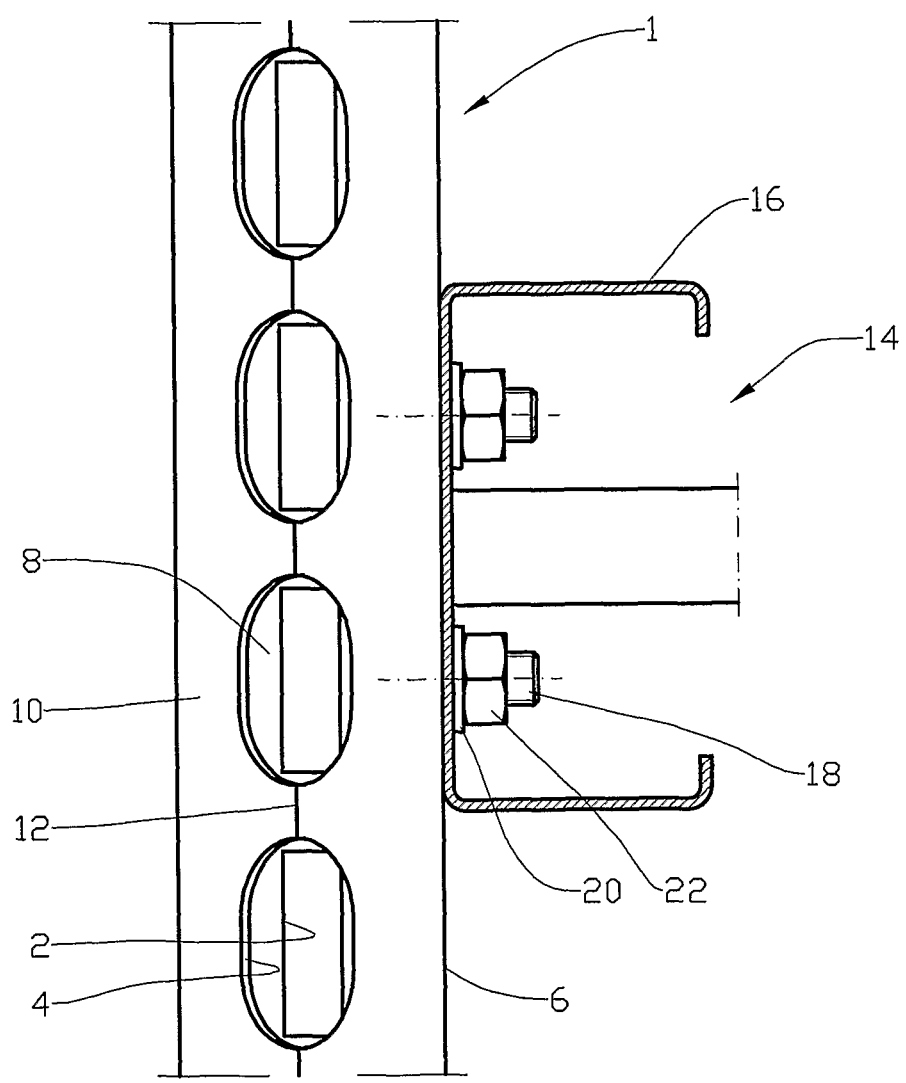
FIG. 1 shows a side view of a profile according to the invention where the profile is used as a column and connected to a cable tray.

In the drawings the reference numeral 1 indicates a long, hollow, three-sided profile device in the form of a plate profile wherein a number of boltholes 2 and cut-outs for bolt openings 4 are made by means of punching before the profile is given its shape by rolling.

The profile is as mentioned a three-sided profile comprising a first side 6, a second side 8 and a third side 10, the first side 6 and the second side 8 being provided with boltholes 2 having a rectangular cross-section where the boltholes are in line in the longitudinal direction of the profile.

The bolt openings 4 are arranged in line in the third side 10 of the profile 1 and each bolt opening 4 corresponds to a bolthole 2 in each of the sides 6 and 8.

A plate joint 12 runs along the third side 10 and is cut by the bolt openings 4, which may be advantageous for technical production reasons.

In FIG. 1 the profile is used as a column and connected to the side member 16 of a cable ladder 14 by means of bolts 18, washers 20 and nuts 22.

Figure 2:
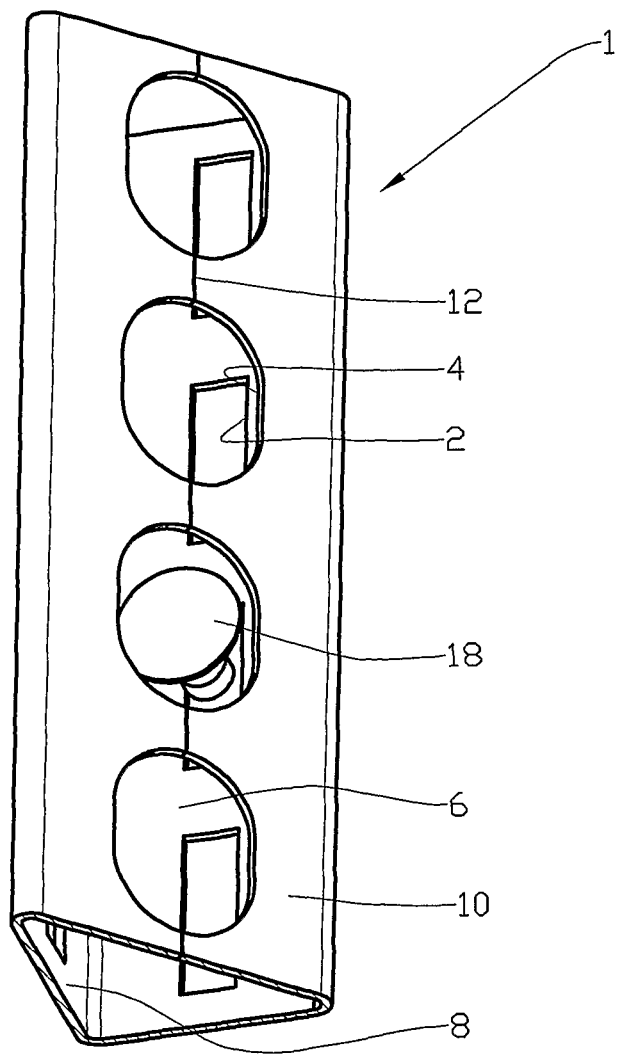
FIG. 2 shows the profile in FIG. 1 in perspective.

In FIG. 2 is shown a section of the profile 2 where a bolt 18 is being displaced in through the bolt opening 4 in the third side 10 and further into one of the boltholes 2 in the first side 6.

Figure 3:
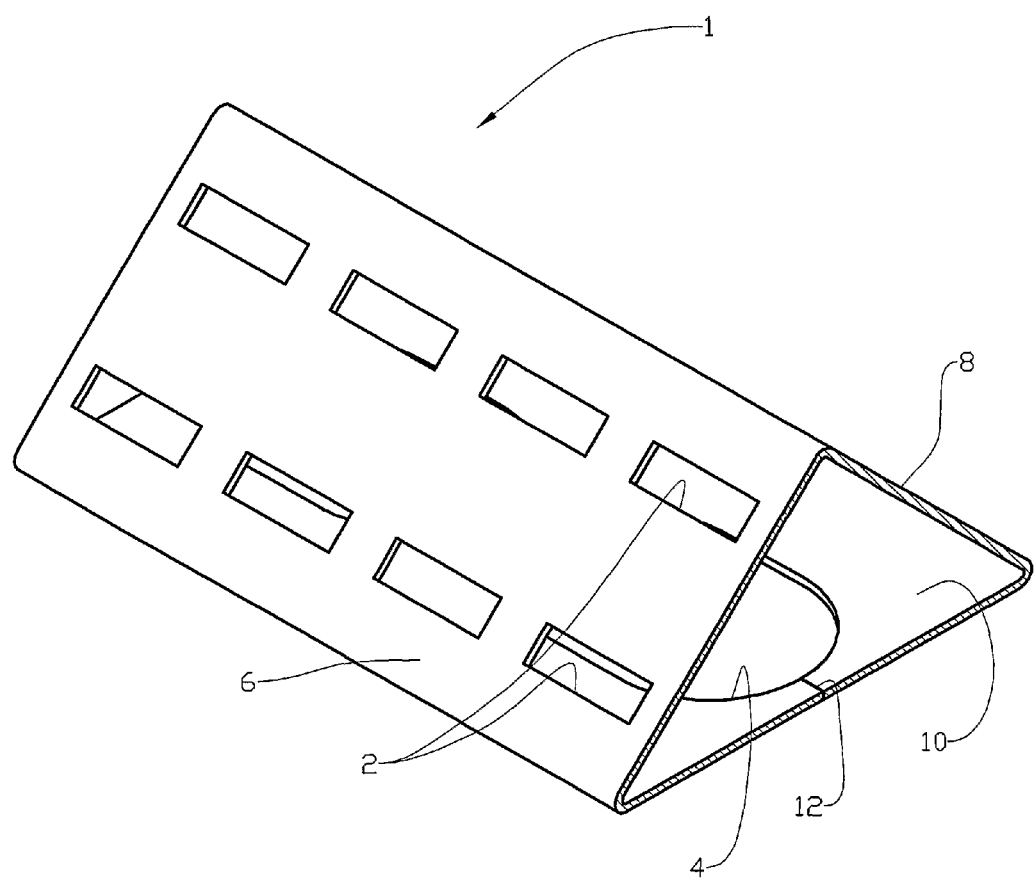
FIG. 3 shows a profile in an alternative embodiment in perspective.

In FIG. 3 the profile 1 is shown in an alternative somewhat larger embodiment wherein two rows of boltholes 2 are arranged in the first side 6 and the second side 8.

The bolt opening 4 is advantageously larger than the head of the bolt 18 and sufficiently large to a not shown operators fingers to reach in to the bolt 18.

Figure 4:
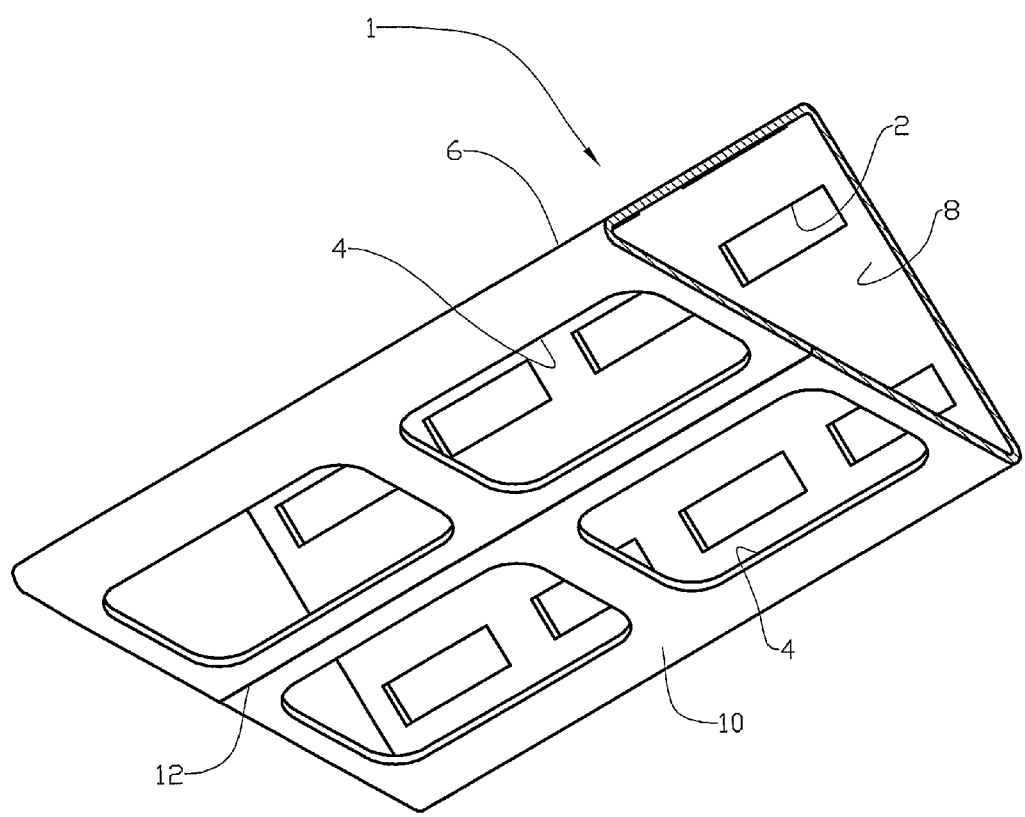
FIG. 4 shows a profile in a further embodiment in perspective.

In FIG. 4 the profile 1 is shown in a further embodiment wherein also two rows of bolt openings 4 are arranged in the third side 10 to further improve access. In FIG. 4 the bolt openings are given a more rectangular shape with rounded corners.

The invention claimed is:

1. A device for building support structures for tubing and cableways, the device comprising a hollow, closed, three-sided profile that is elongated in a length direction and is triangular in a cross direction that is perpendicular to the length direction, the profile having elongated first and second sides that are set at a right angle with respect to each other in the cross direction, each of the first and second sides having a bolt hole that is longer in the length direction than in the cross direction, and an elongated third side that is connected to the first and second elongated sides and has a bolt opening that is sized larger than the bolt holes of the first and second sides, wherein the bolt opening is sized, located and aligned along the third side with respect to the bolt holes which are located in and along the first and second sides to define a straight-line fixation path extending completely through the bolt opening and the bolt hole of at least one of the first and second sides, and extending perpendicularly to the at least one of the first and second sides and at an acute angle relative to the third side, whereby the profile is adapted to be fixed to a building support structure along the straight-line fixation path.

2. The device according to claim 1, wherein the bolt openings are oval and have a largest length in the length direction.

3. The device according to claim 1, wherein the bolt bole is rectangular and has a largest length in the length direction.

4. The device according to claim 1, wherein the profile is a formed plate profile and has a longitudinal plate joint, wherein the bolt opening cuts the plate joint.

5. A device for building support structures for tubing and cableways, the device comprising a hollow, closed, three-sided profile that is elongated in a length direction and is triangular in a cross direction that is perpendicular to the length direction, the profile having elongated first and second sides that are set at a right angle with respect to each other in the cross direction, each of the first and second sides having a bolt hole that is longer in the length direction than in the cross direction, and an elongated third side that is connected to the first and second elongated sides and has a bolt opening that is sized larger than the bolt holes of the first and second sides, wherein the bolt opening is sized, located and aligned along the third side with respect to the bolt holes which are located in and along the first and second sides to define a first straight-line fixation path and a second straight-line fixation path, the first straight-line fixation path extending completely through the bolt opening and the bolt hole in the first side, and extending perpendicularly to the first side and at an acute angle relative to the third side, the second straight-line fixation path extending completely through the bolt opening and the bolt hole in the second side, and extending perpendicularly to the second side and at an acute angle relative to the third side, whereby the profile is adapted to be fixed to a building support structure along at least one of the first and second straight-line fixation paths.

6. The device according to claim 5, wherein the first and second straight-line fixation paths are perpendicular to each other.

7. A device for building support structures for tubing and cableways, the device comprising a hollow, closed, three-sided profile that is elongated in a length direction and is triangular in a cross direction that is perpendicular to the length direction, the profile having elongated first and second sides that are set at a right angle with respect to each other in the cross direction, each of the first and second sides having a bolt hole that is longer in the length direction than in the cross direction, and an elongated third side that is connected to the first and second elongated sides and has a bolt opening that is sized larger than the bolt holes of the first and second sides, wherein the bolt opening is sized, located and aligned along the third side with respect to the bolt holes which are located in and along the first and second sides to define a first straight-line fixation path and a second straight-line fixation path, the first straight-line fixation path extending completely through the bolt opening and the bolt hole in the first side, and extending perpendicularly to the first side and at an acute angle relative to the third side, the second straight-linefixation path extending completely through the bolt opening and the bolt hole in the second side, and extending perpendicularly to the second side and at an acute angle relative to the third side, whereby the profile is adapted to be fixed to a building support structure along at least one of the first and second straight-line fixation paths, wherein the first and second straight-line paths are perpendicular to each other, and wherein the bolt hole in the first side is one of a first plurality of bolt holes that are aligned in adjacent first and second rows in the first side, the first row being located closer to the third side than the second row, and wherein the bolt hole in the second side is one of a second plurality of bolt holes that are aligned in adjacent first and second rows in the second side, the first row being located closer to the third side than the second row.

8. The device according to claim 7, wherein the first straight-line path intersects with the first row in the first side and wherein the second straight-line path intersects with the second row in the second side.

9. A support system for a device used in building support structures for tubing and cableways, the device comprising a hollow, closed, three-sided profile that is elongated in a length direction and is triangular in a cross direction that is perpendicular to the length direction, the profile having elongated first and second sides that are set at a right angle with respect to each other in the cross direction, each of the first and second sides having a bolt hole that is longer in the length direction than in the cross direction, and an elongated third side that is connected to the first and second elongated sides and has a bolt opening that is sized larger than the bolt holes of the first and second sides, wherein the bolt opening is sized, located and aligned along the third side with respect to the bolt holes which are located in and along the first and second sides to define a straight-line fixation path extending completely through the bolt opening and the bolt hole of at least one of the first and second sides, and extending perpendicularly to the at least one of the first and second sides and at an acute angle relative to the third side, whereby the straight-line fixation path is aligned with a fixation hole formed in a building support structure and coincides with a longitudinal axis of a bolt introduced through the bolt opening and received through the bolt hole of at least one of the first and second sides for fixing the profile to the fixation hole in the building support structure.

* * * * *